US007028308B2

(12) United States Patent
Kim

(10) Patent No.: US 7,028,308 B2
(45) Date of Patent: Apr. 11, 2006

(54) METHODS FOR AUTOMATICALLY INSTALLING, MAINTAINING, AND REPAIRING DEVICE DRIVER THROUGH THE INTERNET AND SYSTEM THEREOF

(75) Inventor: Du-il Kim, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 469 days.

(21) Appl. No.: 10/302,317

(22) Filed: Nov. 25, 2002

(65) Prior Publication Data

US 2003/0154425 A1   Aug. 14, 2003

(30) Foreign Application Priority Data

Feb. 8, 2002   (KR) ................................. 2002-7437

(51) Int. Cl.
   *G06F 15/177*   (2006.01)
(52) U.S. Cl. ..................... 719/321; 709/217; 709/219; 710/8; 714/38; 714/44; 719/322; 719/323; 719/324; 719/325; 719/326; 719/327
(58) Field of Classification Search ................ 709/217, 709/219; 714/38, 44; 719/321–327; 710/8; G06F 15/177
   See application file for complete search history.

(56) References Cited

U.S. PATENT DOCUMENTS

| 6,418,486 | B1* | 7/2002 | Lortz et al. ................. 709/217 |
| 6,473,788 | B1* | 10/2002 | Kim et al. ...................... 710/8 |
| 6,594,690 | B1* | 7/2003 | Cantwell .................... 709/217 |
| 6,629,134 | B1* | 9/2003 | Hayward et al. ............... 710/8 |
| 6,668,376 | B1* | 12/2003 | Wang et al. .................... 710/8 |
| 6,671,749 | B1* | 12/2003 | Williams et al. ............... 710/8 |
| 6,681,392 | B1* | 1/2004 | Henry et al. ................. 717/176 |
| 6,694,354 | B1* | 2/2004 | Elg .............................. 710/8 |
| 6,732,195 | B1* | 5/2004 | Baldwin ........................ 710/8 |
| 6,892,299 | B1* | 5/2005 | Abe .............................. 710/8 |
| 2002/0161939 | A1* | 10/2002 | Kim et al. ...................... 710/8 |
| 2003/0023770 | A1* | 1/2003 | Barmettler et al. ......... 709/327 |
| 2003/0065773 | A1* | 4/2003 | Aiba et al. ..................... 710/8 |
| 2003/0088866 | A1* | 5/2003 | Boldon et al. .............. 717/170 |
| 2003/0137689 | A1* | 7/2003 | Bontempi ...................... 710/8 |
| 2004/0030809 | A1* | 2/2004 | Lozano et al. ................. 710/8 |
| 2004/0059842 | A1* | 3/2004 | Hanson et al. ................ 710/8 |

FOREIGN PATENT DOCUMENTS

KR   2002-0082721 A   10/2002

* cited by examiner

*Primary Examiner*—R. Stephen Dildine
(74) *Attorney, Agent, or Firm*—Sughrue Mion, PLLC

(57) ABSTRACT

A method that automatically downloads a device driver through the Internet when installing a peripheral device to a host, a method for fixing errors in the device, and a system thereof. A first embodiment includes receiving an error code and/or a server address corresponding to an error from the device when a device error occurs, connecting to a server using the received address to transfer the error code, and receiving a service page from the server with reference to the error code. A second embodiment includes detecting whether the device is connected, receiving device information including a server address, which provides the device driver and/or interface information, from the device and connecting to the received address to transfer the device information and/or operation system information, and receiving a device driver corresponding to the interface information from a server corresponding to the address and installing the device driver.

9 Claims, 7 Drawing Sheets

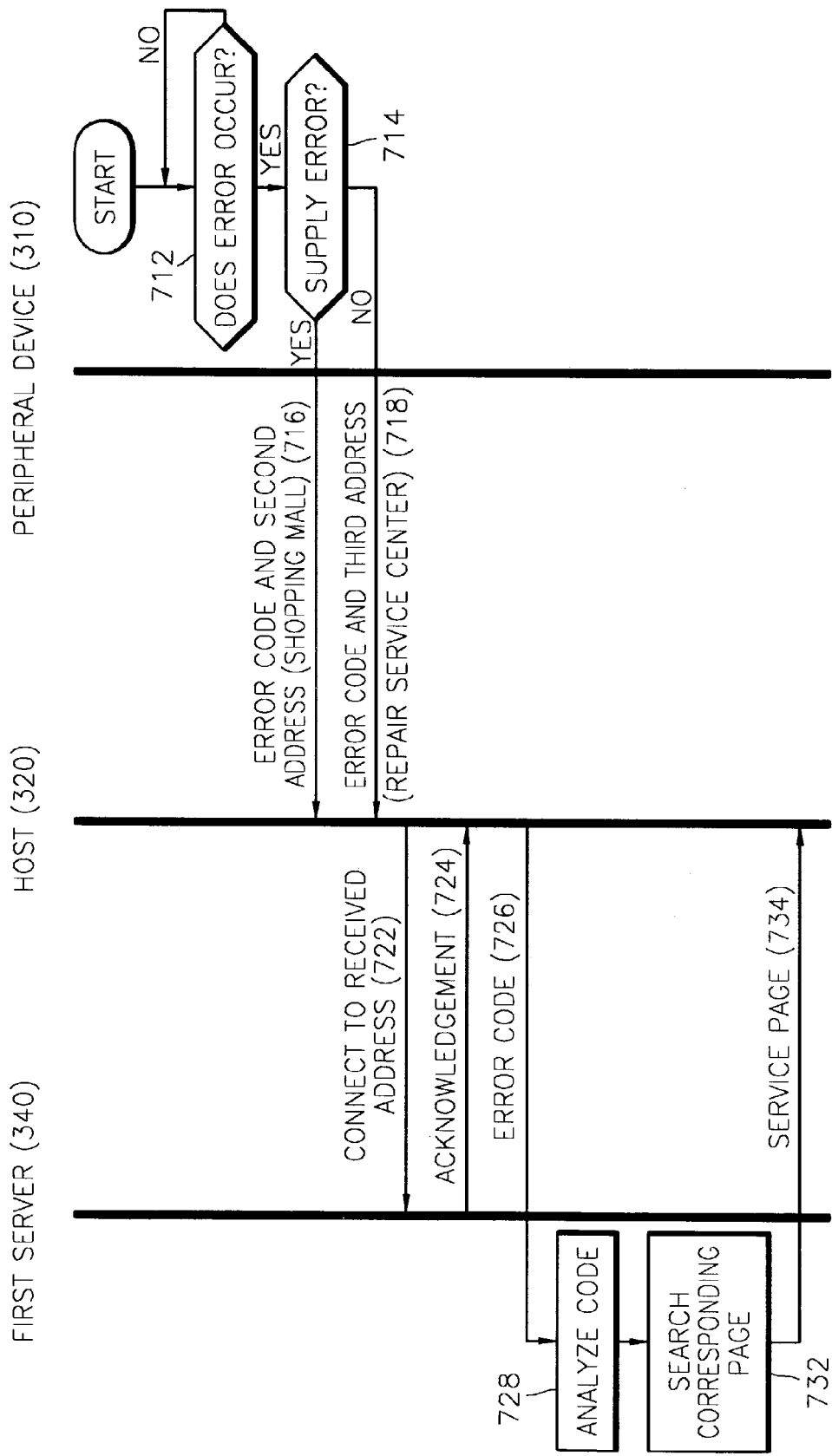

METHODS FOR AUTOMATICALLY INSTALLING, MAINTAINING, AND REPAIRING DEVICE DRIVER THROUGH THE INTERNET AND SYSTEM THEREOF

Priority is claimed to Patent Application Number 2002-7437 filed in Republic of Korea on Feb. 8, 2002, herein incorporated by reference.

BACKGROUND OF THE INVENTION

1. Field of the Invention

The present invention relates to a computer system, and more particularly, to a method for automatically downloading and installing a device driver through the Internet when setting up a peripheral device with a host, a method for maintaining and repairing a device driver when errors occur in the peripheral device, and a system thereof.

2. Description of the Related Art

Recently, the number of peripheral devices, such as a keyboard, a disk drive, a printer, and a video camera, has increased remarkably. In order to add a new device to a computer system, a device driver has to exist in the memory of the computer. Accordingly, the device driver allows the device to operate with the computer and an operation system thereof.

Referring to FIG. 1, a peripheral device 110, such as a printer, is connected to a host 120, such as a personal computer (PC). Here, the software of a device driver for controlling the peripheral device 110 is directly installed in the host 120 by using a recording medium 130, such as a floppy disk or a CD-ROM.

FIG. 2 is a flowchart illustrating a method for installing a device driver in the system of FIG. 1.

First, a peripheral device 110 is connected to a host 120 in a plug-in-plug method in step 210. The host 120 transfers an acknowledgement of the connection to the peripheral device 110 in step 220, and the peripheral device 110 transfers device information to the host 120 in step 230. Thereafter, the host 120 detects a device driver according to the receipt of the device information from the peripheral device 110 in step 240 to check the existence of the device driver in step 250. When the host 120 finds the device driver, the host 120 installs the driver and initializes the device in step 260. If the host 120 cannot find the device driver, the host 120 displays a driver insertion message on a monitor. Accordingly, a user installs a device driver by inserting a CD-ROM or a floppy disk into the host 120 in order to set up a peripheral device with the host.

However, a conventional method for installing a device driver by using a recording medium requires a user to insert a CD-ROM or a floppy disk and there exists the possibility for the user to lose the CD-ROM or the floppy disk. In addition, if the user loses the disk or the diskette of the corresponding device driver, the user has to search the Internet and download the device driver. In this case, if the user cannot find the device driver through the Internet, the user cannot use the device.

In addition, if a peripheral device connected to a computer system is broken or an error occurs in the peripheral device, a user has to analyze the cause of the breakage or error to fix the peripheral device or to request a repair service. In particular, if a drum of a printer is broken or the lifespan of the drum is over, a novice cannot detect the cause of the error, and may unnecessarily request repair service. In this case, a repair service engineer has to analyze the cause of the error and bring a supply, e.g., a drum, resulting in a time consuming task.

SUMMARY OF THE INVENTION

To solve the above-described problems, it is a first objective of the present invention to provide a method for automatically installing a device driver to a host through the Internet when setting up a peripheral device with the host.

It is a second objective of the present invention to provide a method for fixing a peripheral device by using the Internet when an error occurs in the peripheral device set up with a host.

It is a third objective of the present invention to provide a peripheral device to realize a method for automatically installing a device driver and a method for fixing a peripheral device through the Internet.

To accomplish the first objective of the present invention, a method of installing a driver of a peripheral device which is connected to a host device comprises detecting whether the peripheral device is connected, receiving device information including a server address, which provides the device driver and/or interface information, from the peripheral device and connecting to the received server address to transfer the device information and/or operation system (OS) information, and receiving a device driver corresponding to the transferred interface information from a server corresponding to the server address and installing the device driver.

To accomplish the second objective of the present invention, a method of fixing a peripheral device connected to a host device comprises receiving an error code and/or a server address to correspond to an error from the peripheral device when an error is generated in the peripheral device, connecting to a corresponding server by using the received server address to transfer the error code, and receiving a corresponding error response service page from the connected server with reference to the error code.

To accomplish the third objective of the present invention, a peripheral device connectable to a host device comprises a storage unit for storing a server address in which a device driver is located and at least one server address corresponding to errors, and a control unit for transferring the server address stored in the storage unit to the host device when the peripheral device is connected to the host device and transferring the server address corresponding to the error stored in the storage unit to the host device when an error occurs.

BRIEF DESCRIPTION OF THE DRAWINGS

The above objectives and advantages of the present invention will become more apparent by describing in detail preferred embodiments thereof with reference to the attached drawings in which:

FIG. 7 is a flowchart illustrating a method for fixing a device according to the present invention.

DETAILED DESCRIPTION OF THE INVENTION

Figure 1:
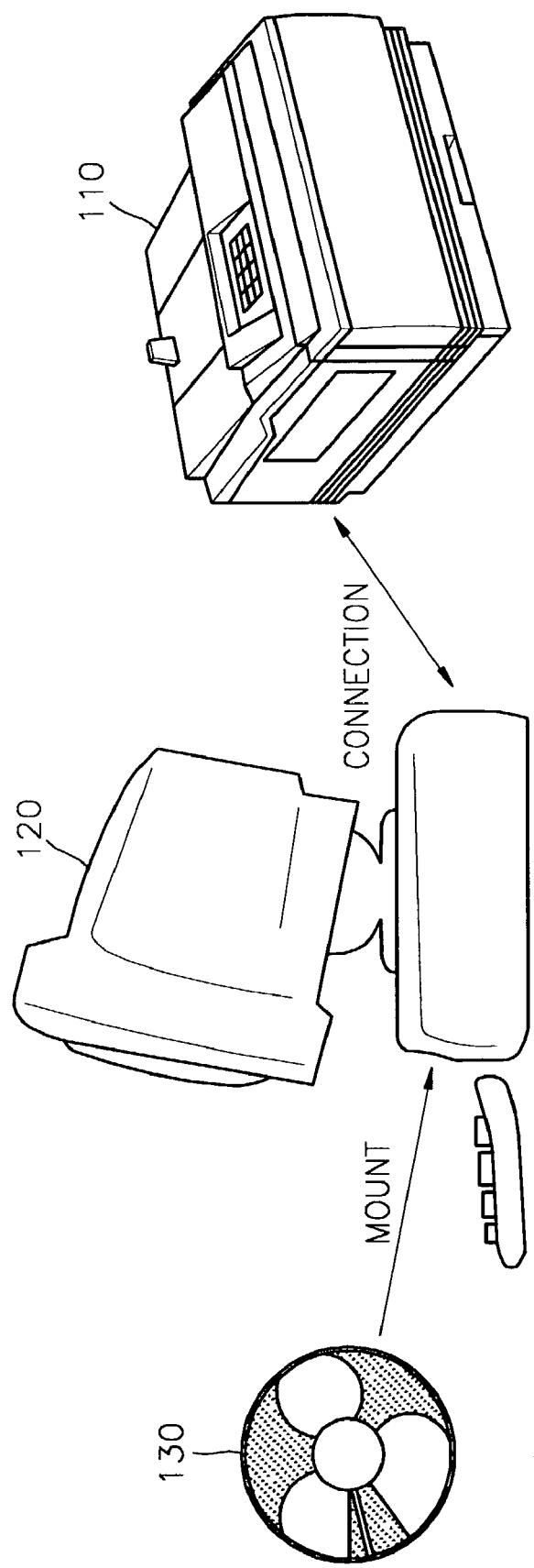
FIG. 1 illustrates a computer system in which a conventional device driver is installed.
Figure 2:
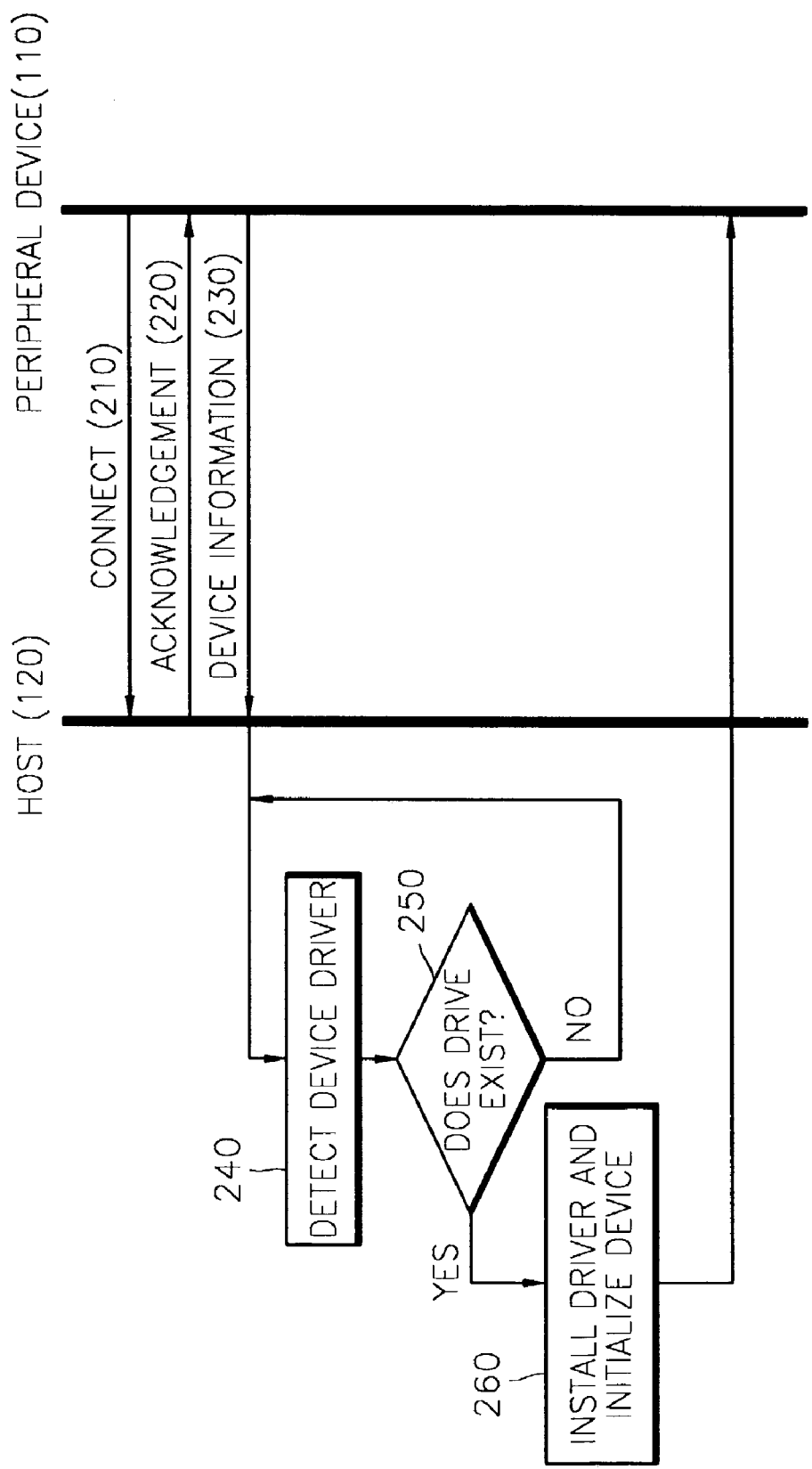
FIG. 2 is a flowchart illustrating a method for installing a device driver to a system of FIG. 1.
Figure 3:
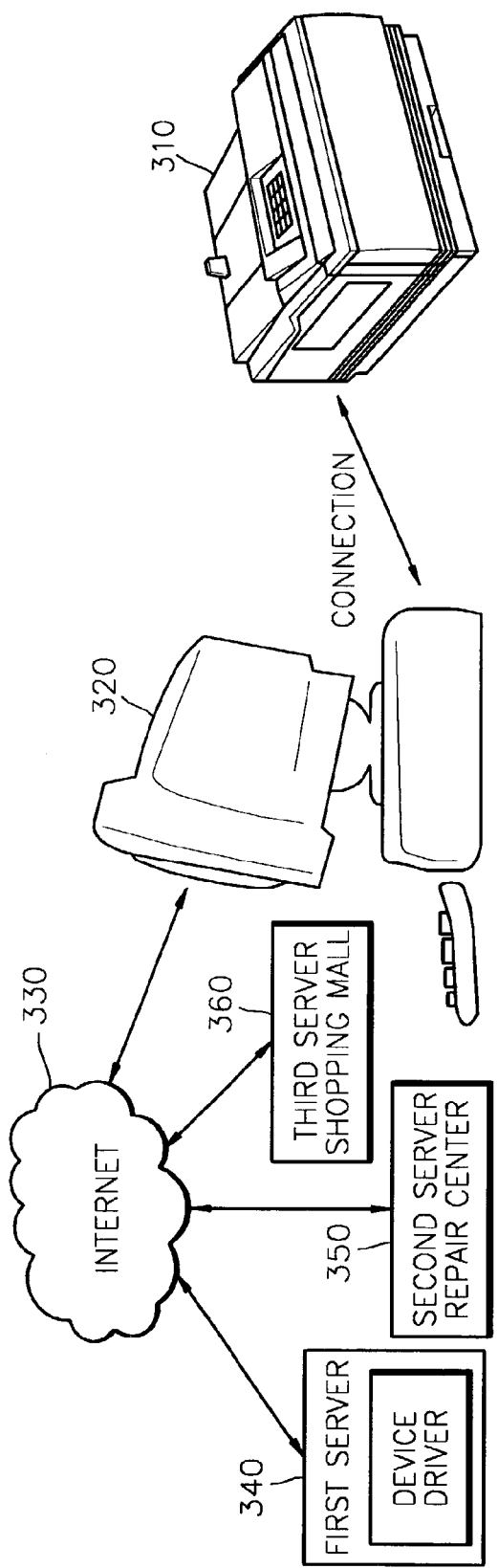
FIG. 3 illustrates a computer system in which a device driver is installed and fixed according to the present invention.

FIG. 3 illustrates a computer system in which a device driver is installed and fixed according to the present invention.

Referring to FIG. 3, a peripheral device 310 including a printer, a scanner, or a facsimile is connected to a host device 320 by a plug-in-plug method. In addition, the host device 320 is connected to various servers 340, 350, and 360 through the Internet 330. For example, the first server 340 provides a web service about a device driver, the second server 350 provides a web service about repair service center information, and the third server 360 provides a web service about a shopping mall. Here, the peripheral device 310 includes memory for storing a plurality of server addresses (URLs). In addition, the host device 320 connects to the servers 340, 350, and 360 by using the URLs received from the peripheral device 310 to download and install a device driver and a program for receiving a service web page. It is preferable that the host device 320 realizes a program that hooks a window message that is generated by detecting a new device and connects to a server, downloads and installs a driver and a service page, and initializes the device. Here, the host device may correct an operation system (OS) and automatically install and receive a device driver and a service web page by using the corrected OS.

Figure 4:
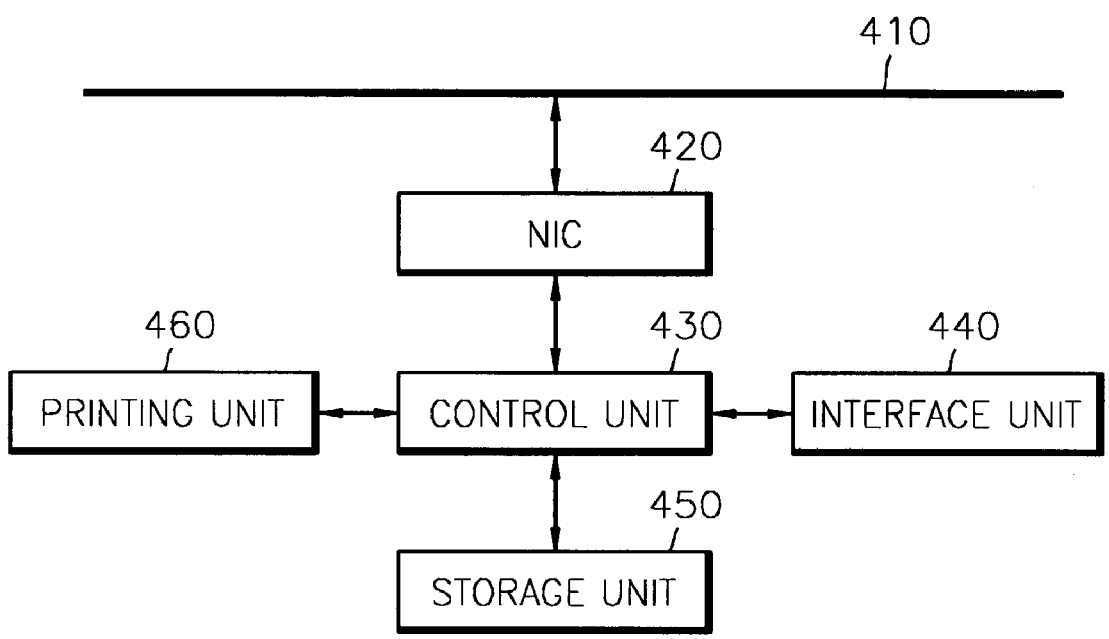
FIG. 4 is a detailed block diagram illustrating a printer as an example of a peripheral device of FIG. 3.

FIG. 4 is a detailed block diagram illustrating a printer as an example of a peripheral device of FIG. 3.

Referring to FIG. 4, a storage unit 450 stores one URL including a device name and a device driver and/or at least one URL for repairing errors. For example, the storage unit 450 is divided into a flash ROM and RAM. Here, the flash ROM stores interface information, device name, and error codes. The RAM stores a driver server address, i.e., a first address; a URL corresponding to each error code, for example, a shopping mall server address corresponding to a first error code, i.e., a second address; and a repair service center server address corresponding to a second error code, i.e., a third address. A network interface card (NIC) 420 is arranged to connect to a local area network (LAN) 410. An interface unit 440 modulates and demodulates a signal to transmit and receive data to and from a host device 320. A control unit 430 detects an interface connected to the host device 320 upon plugging-in to the host device 320 to transfer the detected interface and the content of the storage unit 450 to the host device 320. In other words, the control unit 430 transfers the URLs stored in the storage unit 450 to the host device 320 and transfers the URLs for correcting errors stored in the storage unit 450 to the host device 320 when an error occurs. A printing unit 460 prints according to a print command sent from the control unit 430.

Figure 5:
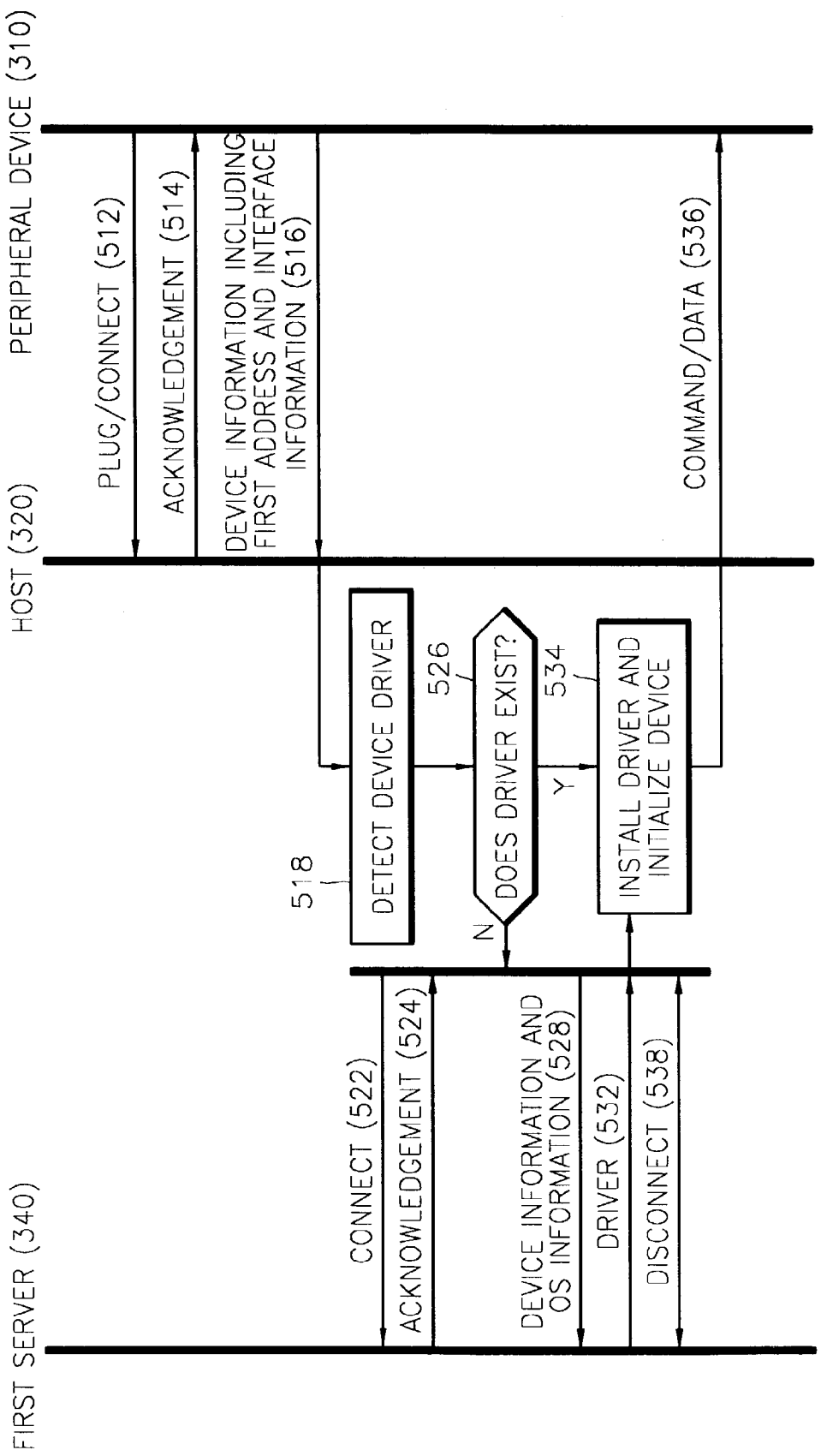
FIG. 5 is a flowchart illustrating a method for installing a device driver according to a first embodiment of the present invention.

FIG. 5 is a flowchart illustrating a method for installing a device driver according to a first embodiment of the present invention.

A peripheral device 310 is connected to a host device 320 by a plug-in-plug method in step 512. The host device 320 detects the connection and transfers acknowledgement of the connection to the peripheral device 310 in step 514. Here, the peripheral device 310 detects an interface connected to the host device 320.

Thereafter, the peripheral device 310 transfers device information including a driver server address, i.e., a first address, and interface information and/or OS information stored in a storage unit 450 to the host device 320 in step 516.

The host device 320 detects data stored in a memory in step 518 to check for the existence of a corresponding device driver in step 526. When the host device 320 finds the corresponding device driver, the host device installs the driver and initializes the device in step 534.

If the host device 320 cannot find the corresponding device driver, the host device 320 demands a connection to the first server 340 that provides a device driver in step 522. Next, the first server 340 transfers acknowledgement of connection to the host device 320 in step 524. Accordingly, the host device 320 transfers the device information and/or the OS information to the first server 340 in step 528. The first server 340 detects the corresponding device driver to transfer the device driver to the host device 320 in step 532 and disconnects from the host device 320 in step 538. The host device 320 installs the received device driver and initializes the device in step 534.

Thereafter, the host device 320 transfers commands and data for controlling the corresponding device driver to the peripheral device 310 in step 536.

Figure 6:
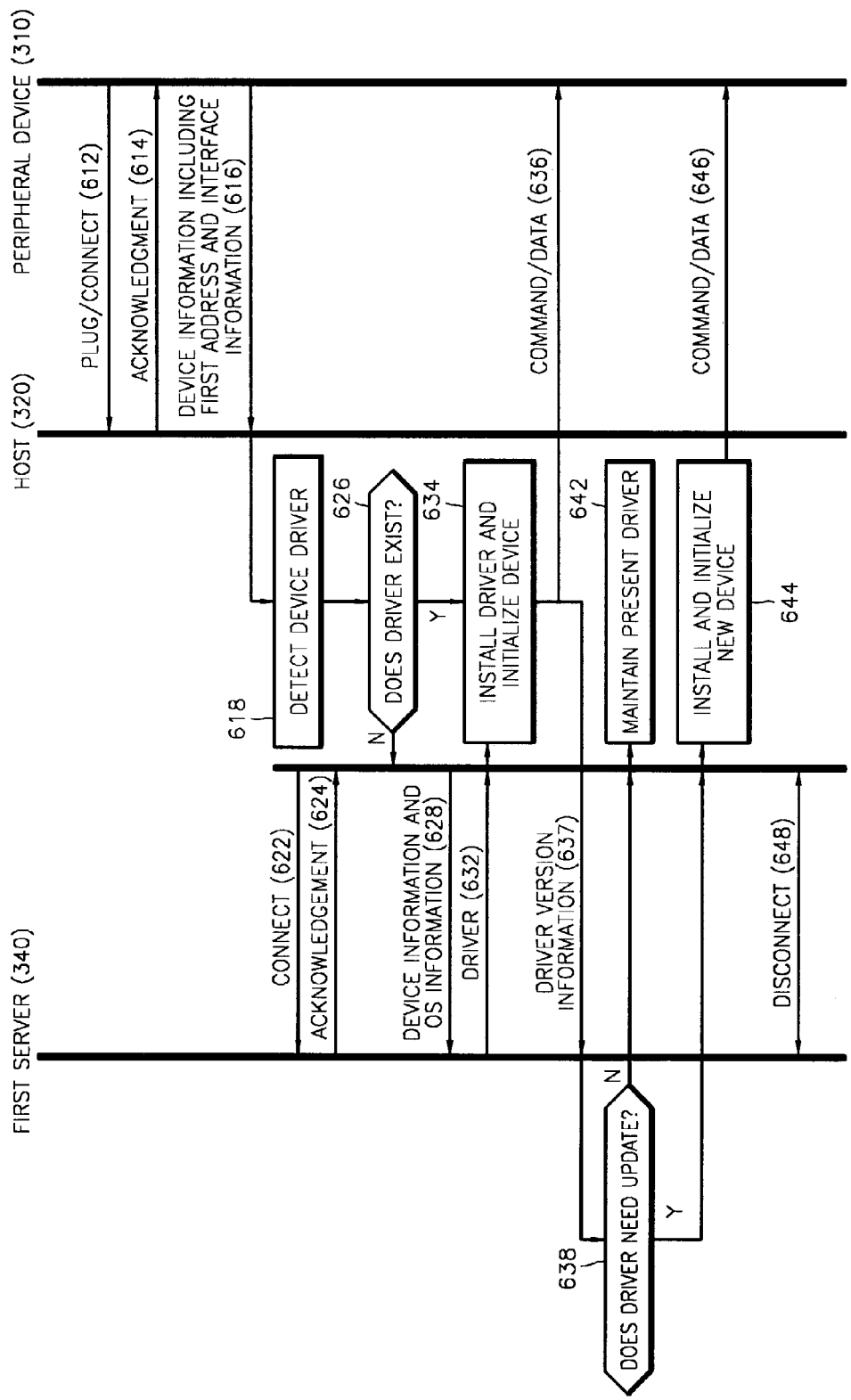
FIG. 6 is a flowchart illustrating a method for installing a device driver according to a second embodiment of the present invention.

FIG. 6 is a flowchart illustrating a method for installing a device driver according to a second embodiment of the present invention.

Here, the operations in steps 612 through 636 are the same as those in steps 512 through 536 of FIG. 5 so the descriptions of the operations in steps 612 through 636 will be omitted.

After a host device 320 installs a received device driver and initializes a device, the host device 320 transfers corresponding driver version information to a first server 340 in step 637.

The first server 340 compares the received driver version with a stored driver version to check whether to update the driver in step 638. Here, if the received driver version is lower than the stored driver version, the first server 340 transfers an update driver to the host device 320.

If the host device 320 receives a message containing commands not to update the driver from the first server 340, the host device 320 maintains the present driver version in step 642. If the host device 320 receives an update driver, the host device 320 installs and initializes a new device in step 644 and transfers commands and data for controlling the corresponding device driver to the peripheral device 310 in step 646.

FIG. 7 is a flowchart illustrating a method for fixing a device according to the present invention.

A peripheral device 310 checks whether an error occurs in step 712, and checks whether the error is a supply error in step 714.

If the error is a supply error, the corresponding error code and a second address corresponding to a shopping mall service are transferred from the storage unit 450 to the host device 320 in step 716. In another case, the corresponding error code corresponding to a system error and a third address corresponding to a repair service center server are transferred to the host device 320 in step 718.

The host device 320 connects to the second server 350 or the third server 360 by using the second address, i.e., a shopping mall server address, or the third address, i.e., a repair service center server address, received from the peripheral device 310 according to the kind of error in step 722.

The second server 350 or the third server 360 transfers an acknowledgement of connection to the host device 320 in step 724.

The host device 320 transfers error codes for denoting the kinds of errors to the second server 350 or the third server 360 in step 726.

The second server 350 or the third server 360 analyzes the error codes transferred from the host device 320 to decipher which kinds of errors they are in step 728.

After the second server 350 and the third server 360 searches service pages corresponding to the analyzed error codes in step 732, the second server 350 and the third server 360 transfer the corresponding service web pages to the host device 320 in step 734. Here, since the second server 350 and the third server 360 require replacements or refills according to the supply error, the second server 350 and the third server 360 search shopping pages for the corresponding supplies. In the case of errors other than the supply error, which are mostly system errors, the second and third servers 350 and 360 search corresponding repair service center pages.

Thereafter, the host device 320 displays the corresponding web pages on a monitor so that the user may select the web page.

The present invention can be realized as a code on a recording medium, which can be read by a computer. Here, the recording medium includes any kind of recording device in which data is recorded, such as ROM, RAM, CD-ROM, a magnetic tape, a hard disk, a floppy disk, a flash memory, and an optical data recording device, while further including a carrier wave, e.g., transmission over the Internet. In addition, the recording media read by a computer are distributed to computer systems, connected by a network, able to record and execute codes that can be read by a computer.

As described above, when a new peripheral device is mounted to a host, a corresponding device driver is downloaded through the Internet so that a user may conveniently use the peripheral device. In addition, a device driver having new functions is easily updated, thereby enhancing user convenience. Here, a debugged new device driver is easily updated to reduce errors in the field so as to lower service costs. Furthermore, interface information on the connection between present peripheral devices and a host is transferred to the host so that the host receives the device driver of a corresponding interface to reduce transfer time. As a result, the installation speed of a device driver can be improved. When an error occurs in a peripheral device, a host is automatically connected to a shopping mall or a repair service center to easily fix the peripheral device so that the peripheral device is maintained at a low cost and a service provider can enhance revenue by operating a shopping mall.

What is claimed is:

1. A method for fixing a peripheral device connected to a host device, the method comprising:
   receiving an error code and a server address to correspond to an error from the peripheral device when an error is generated in the peripheral device;
   connecting to a corresponding server by using the received server address to transfer the error code; and
   receiving a corresponding error response service page from the connected server with reference to the error code.

2. The method of claim 1, wherein a corresponding error code and a shopping mall server address are received according to a supply error and a corresponding error code and a repair service center address are received according to a system error.

3. A method for installing a driver of a peripheral device which is connected to a host device, the method comprising:
   detecting whether the peripheral device is connected;
   receiving device information including a server address, which provides the driver and interface information, from the peripheral device and connecting to the received server address to transfer the device information and operation system (OS) information;
   receiving a device driver corresponding to the transferred interface information from a server corresponding to the server address and installing the device driver;
   transferring commands and data for controlling the device driver, to the peripheral device.

4. The method of claim 3, further including:
   detecting a device driver when the host receives the device information from the peripheral device; and
   installing the device driver and initializing the device when the corresponding device driver is checked.

5. A method for installing a driver of a peripheral device which is connected to a host device, the method comprising:
   detecting whether the peripheral device is connected to the host device;
   receiving a server address, which provides the driver and interface information, from the peripheral device;
   checking driver version information of the peripheral device;
   transferring the driver version information to a server denoted by the received address; and
   installing a received updated device driver when the host receives a device driver of an update driver version.

6. The method of claim 5, further including maintaining the present driver when the host receives a message indicating it is not necessary to update the driver from the denoted server.

7. A peripheral device connectable to a host device, the peripheral device comprising:
   a storage unit for storing a server address in which a device driver is located and at least one server address corresponding to errors; and
   a control unit for transferring the server address stored in the storage unit to the host device when the peripheral device is connected to the host device and transferring the server address corresponding to the error stored in the storage unit to the host device when an error occurs.

8. The peripheral device of claim 7, wherein the control unit transfers the server address stored in the storage unit to the host device by detecting interface information connected to the host device.

9. The peripheral device of claim 7, wherein the storage unit includes a device name, a driver server address, and service-providing server addresses to correspond to the errors.

* * * * *